Sept. 19, 1967   C. H. KEITH   3,342,398
REINFORCED CONTAINER STRUCTURES
Original Filed Dec. 17, 1962   10 Sheets-Sheet 1

INVENTOR.
CLIFFORD H. KEITH
BY
ATTORNEY

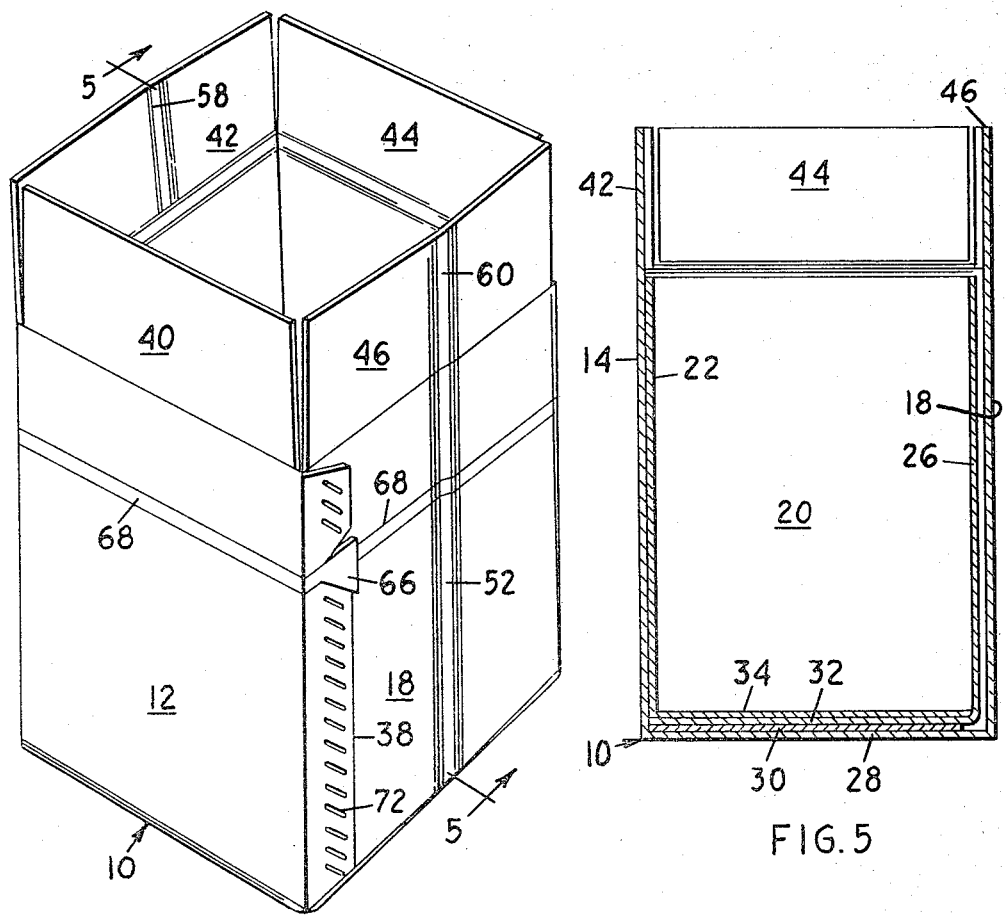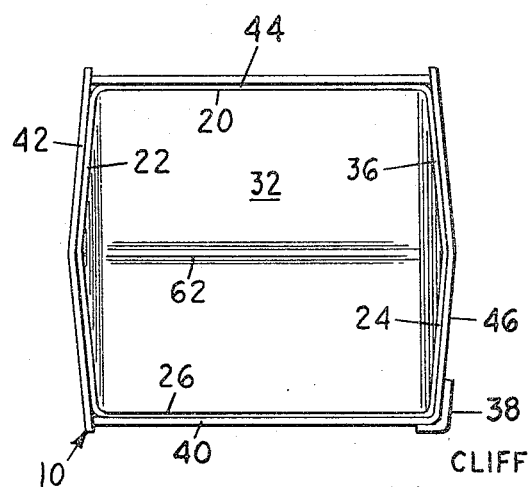

Sept. 19, 1967 C. H. KEITH 3,342,398
REINFORCED CONTAINER STRUCTURES
Original Filed Dec. 17, 1962 10 Sheets-Sheet 3

INVENTOR.
CLIFFORD H. KEITH
BY
ATTORNEY

Sept. 19, 1967 C. H. KEITH 3,342,398
REINFORCED CONTAINER STRUCTURES
Original Filed Dec. 17, 1962 10 Sheets-Sheet 4

INVENTOR.
CLIFFORD H. KEITH
BY
ATTORNEY

Sept. 19, 1967 C. H. KEITH 3,342,398
REINFORCED CONTAINER STRUCTURES
Original Filed Dec. 17, 1962 10 Sheets-Sheet

INVENTOR.
CLIFFORD H. KEITH
BY
ATTORNEY

Sept. 19, 1967 C. H. KEITH 3,342,398
REINFORCED CONTAINER STRUCTURES
Original Filed Dec. 17, 1962 10 Sheets-Sheet 6

INVENTOR.
CLIFFORD H. KEITH
BY
ATTORNEY

Sept. 19, 1967   C. H. KEITH   3,342,398
REINFORCED CONTAINER STRUCTURES
Original Filed Dec. 17, 1962   10 Sheets-Sheet 7

INVENTOR.
CLIFFORD H. KEITH
BY Irvin V. Glenn
ATTORNEY

Sept. 19, 1967 C. H. KEITH 3,342,398
REINFORCED CONTAINER STRUCTURES
Original Filed Dec. 17, 1962 10 Sheets-Sheet 10

INVENTOR.
CLIFFORD H. KEITH
BY Irvin V. Gleim
ATTORNEY

United States Patent Office 3,342,398
Patented Sept. 19, 1967

3,342,398
REINFORCED CONTAINER STRUCTURES
Clifford H. Keith, Cincinnati, Ohio, assignor to The Mead Corporation, Dayton, Ohio, a corporation of Ohio
Original application Dec. 17, 1962, Ser. No. 246,873, now Patent No. 3,286,900, dated Nov. 22, 1966. Divided and this application Mar. 23, 1966, Ser. No. 536,858
4 Claims. (Cl. 229—16)

ABSTRACT OF THE DISCLOSURE

A reinforced container having two-ply side and end walls and a four-ply bottom is formed from a unitary blank comprising foldably interconnected inner and outer side and end panels and liner panels, a bottom panel and bottom liner panels, and a series of closure flaps foldably connected along the upper edges of the outer side and end panels. Medial scoring and folding of certain panels provides collapsibility of the assembled container to minimize shipping or storage space requirements of an empty container.

---

This application is a division of my copending application entitled, "Reinforced Container Structures," Ser. No. 246,873, filed Dec. 17, 1962, now U.S. Patent 3,286,900, issued Nov. 22, 1966, which was, in turn, a continuation-in-part of a copending application entitled, "Reinforced Container and Blanks Therefor," Ser. No. 843,498, filed Sept. 30, 1959, now U.S. Patent No. 3,069,062, issued Dec. 18, 1962.

This invention relates to improved containers and to improved blanks for making such containers. More specifically, this invention relates to heavy-duty containers being formed from paperboard or the like having reinforced bottoms, tops, and/or side walls thereof. This invention also relates specifically to improved blanks for forming such heavy duty containers and the like.

It is well known in the container art that ordinary paperboard containers cannot be readily utilized for heavy duty purposes as the conventional structures lack sufficient strength and reinforcement means to support the relatively heavy loads of high density goods, non-rigid goods, and the like. Accordingly, when conventional paperboard containers are utilized for shipping and/or storing high density goods and the like, the heavy loads of the goods that are imposed against the various walls of the containers tend to rupture the same thereby resulting in subsequent loss and/or damage to the goods.

Many unsuccessful attempts have been made by various manufacturers in the past to provide a heavy duty container that is relatively inexpensive to manufacture, relatively easy to assemble, and which is provided with sufficient reinforcing means to support the relatively heavy loads of high density goods and the like.

Accordingly, it is an object of the present invention to provide an improved heavy duty container.

It is another object of the present invention to provide an improved container blank for forming such a container.

Another object of the present invention is to provide an improved closure means for containers and the like.

A further object of the invention is to provide, in container structures of the character set forth, improved blanks therefor so formed as to result in a minimum of wastage of material in the production of same.

Other objects, uses and advantages of the present invention will become apparent from a reading of the following specification taken in conjunction with the accompanying drawings forming a part hereof and wherein:

FIGURE 4 is a further perspective view showing the paperboard container structure of FIGURE 1 in its erect position;

FIGURE 5 is a cross sectional view of the container illustrated in FIGURE 4 and is taken on line 5—5 thereof;

FIGURE 6 is a top view of the container illustrated in FIGURE 4;

Figure 1:
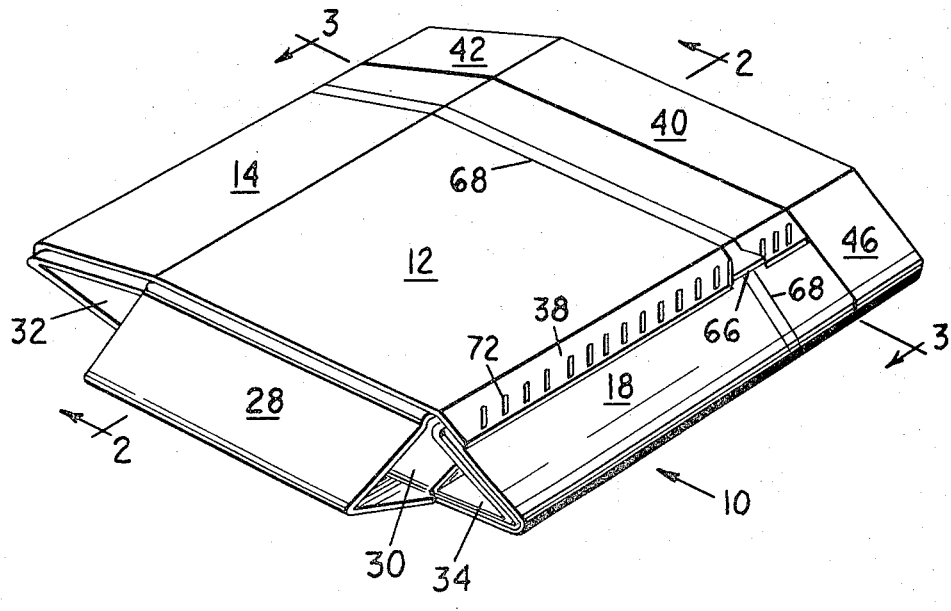
FIGURE 1 is a perspective view illustrating a collapsed paperboard structure formed in accordance with the teachings of this invention.
Figure 2:
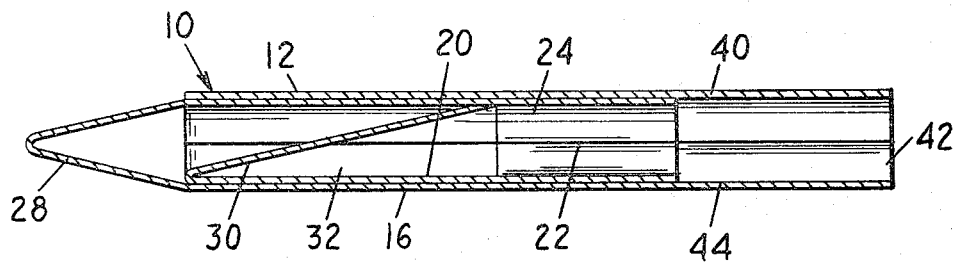
FIGURE 2 is a cross sectional detail view of the container illustrated in FIGURE 1 and is taken on line 2—2 thereof.
Figure 3:
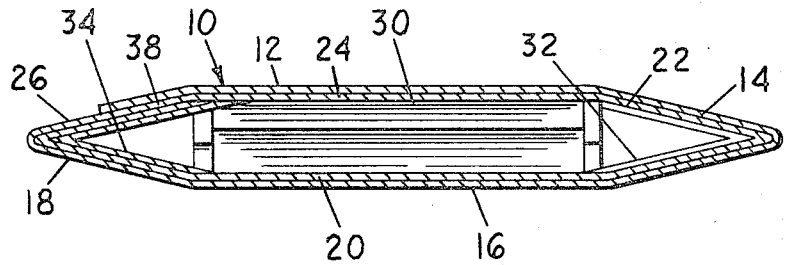
FIGURE 3 is another cross sectional detail view taken substantially on line 3—3 of FIGURE 1.

While various container structures of this invention are hereinafter described as being particularly adapted for packaging nails, it is to be understood that these container structures are also readily applicable for packaging other types of high density goods, non-rigid goods, and the like, and may also be utilized for any other desired purpose. Further, because of the double side walls of these containers, the same may have increased up and down strength and, therefore, these containers can be stacked with greater security and alignment. In particular, these containers are readily adaptable for palletizing and unitizing.

Reference is now made to the accompanying drawings wherein like reference numerals are utilized throughout the various figures thereof to designate like parts where appropriate, and particular reference is made to FIG-
URES 1–11 illustrating one embodiment of this invention.

A container structure of this invention is shown in collapsed form in FIGURE 1 and in erect form in FIGURE 4, the container structure being indicated generally by reference numeral 10. An improved blank of this invention is illustrated in FIGURE 7 and may be utilized for forming the container structure 10 in a manner hereinafter described.

Figure 7:
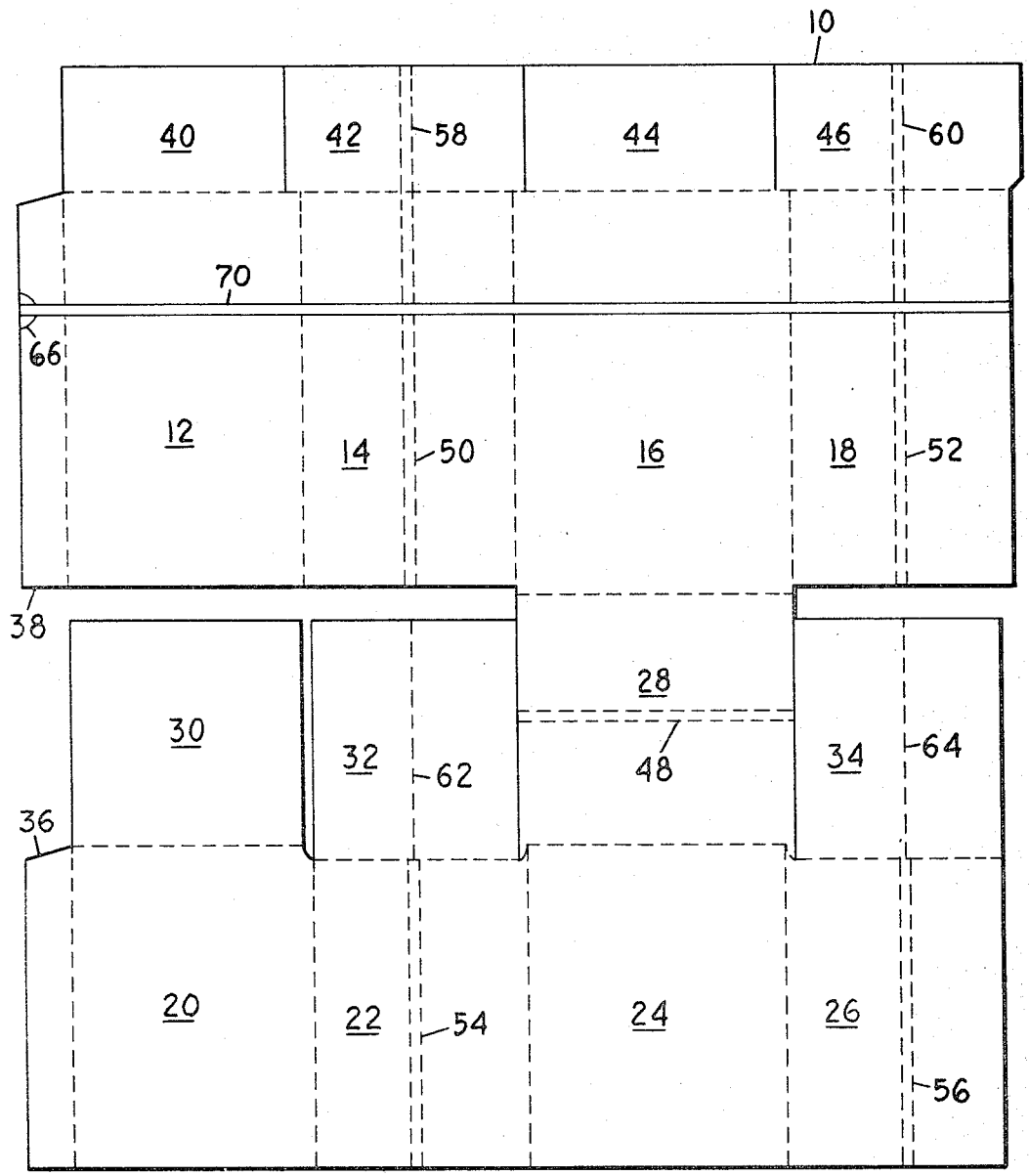
FIGURE 7 is a plan view of a blank formed in accordance with the teachings of this invention, the blank forming the paperboard structure illustrated in FIGURES 1–6.

As shown in FIGURE 7, the illustrated container structure 10 of the present invention is formed from a substantially rectangular blank that is cut and scored to define a first series of four foldably connected side wall means or panels 12, 14, 16 and 18, and a corresponding second series of foldably connected and substantially coextensive liner panel means or liner panels 20, 22, 24 and 26, that are aligned in spaced relation with respect to the first panel series.

Between the respective adjacent edges of corresponding intermediate panels 16 and 24 and in each panel series, a connection panel 28 has opposed edges thereof foldably connected. This connecting panel 28 is foldably connected coextensively at the respective adjacent edges of panels 16 and 24, and the extent of connecting panel 28 between these foldably connected edges corresponds substantially to the width of the respective panels 14 and 18, and 22 and 26, to each side of the panels at which it is foldably connected.

On each of panels 20, 22 and 26 of the second series, flap panels 30, 32 and 34 are foldably connected at the inner edges thereof, and these flap panels 30, 32 and 34 are substantially coextensive in relation to the previously mentioned connecting panel 28. In addition, one terminal panel 20 of the second series has a side edge flap 36 foldably connected thereto. A similar side edge flap 38 is foldably connected to terminal panel 12 of the first series, and the panels in this series have closure flaps 40, 42, 44 and 46 foldably connected at outer edges thereof to complete the elements of the blank structure.

The collapsible nature of container structure 10 is provided for in the blank by medial scoring at 48 in connecting panel 28 between the foldably connected edges thereof; and by further medial scoring 50, 52, 54 and 56 in the respective first series panels 14 and 18, and second series panels 22 and 26, at each side of the panels to which connecting panel 28 is foldably connected, as well as by aligned medial scoring at 58, 60, 62, 64 in the respectively related closure flaps 42 and 46, and flap panels 32 and 34.

Figure 11:
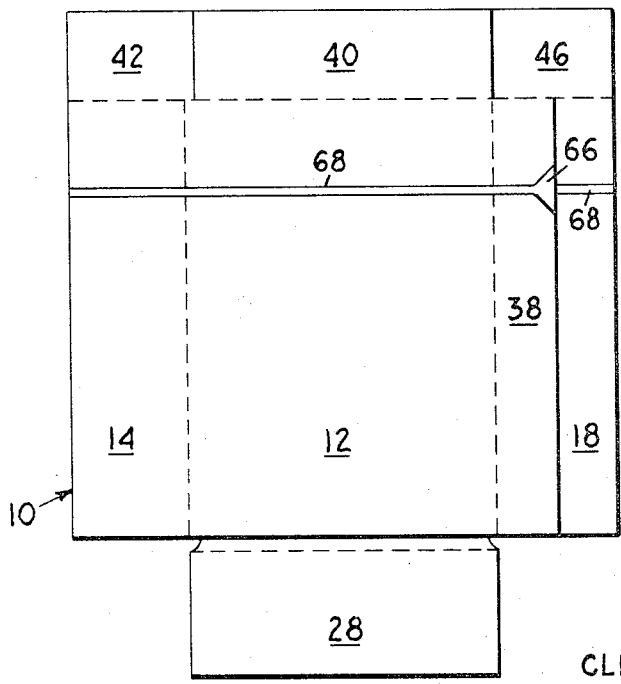
FIGURE 11 is a further corresponding plan view showing the final blank folding step by which the assembly of the container structure elements is completed in collapsed form for securing to provide the container structure as shown in FIGURE 1.

In addition, the blank is further preferably formed with a tear tab 66 slit at the free edge of side edge flap 38 on terminal panel 12 of the first series in spaced relation from the outer edges of the panels of this first series, and in alignment with spaced scores 68, see FIGURES 1, 4 and 11, extending continuously across all of first series panels 12, 14, 16 and 18 at the faces thereof opposite those shown in FIGURE 7, while a high strength reinforcing tape 70, such as a fiber glass tape, is applied across the inner faces of these panels in alignment with tear tab 66 and tear strip 68, so as to provide for convenient opening of container structure 10 to obtain access readily to a package load secured therein.

Figure 8:
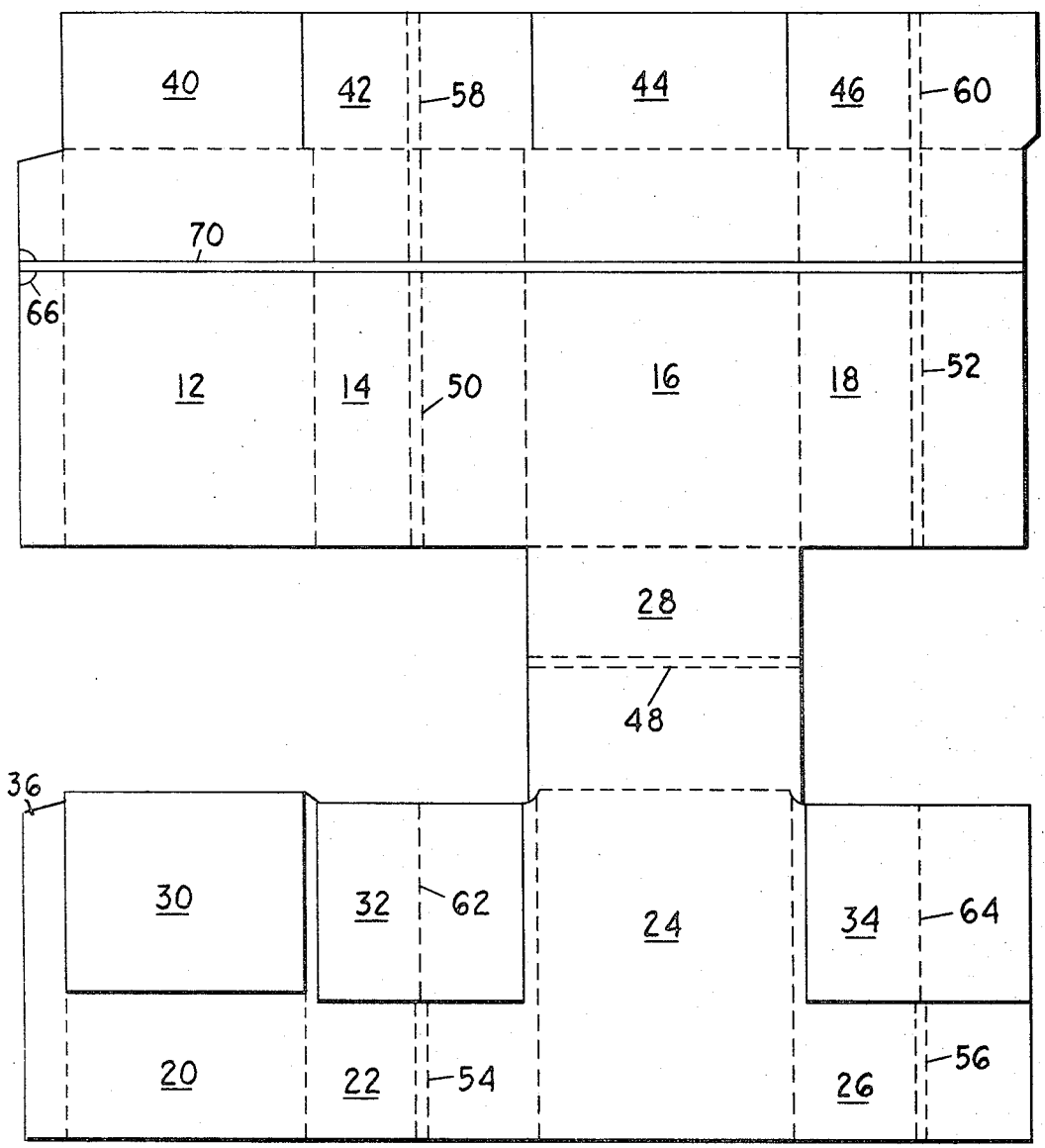
FIGURE 8 is a corresponding plan view illustrating the first folding step in forming the container structure of FIGURE 1 from the blank shown in FIGURE 7.

In forming container structure 10 according to the present invention from the blank shown in FIGURE 7, the first step consists in folding flap panels 30, 32, 34 downwardly in doubled relation with respect to panels 20, 22 and 26 of the second series on which they are foldably connected so as to arrange the blank elements in the form illustrated in FIGURE 8.

Figure 9:
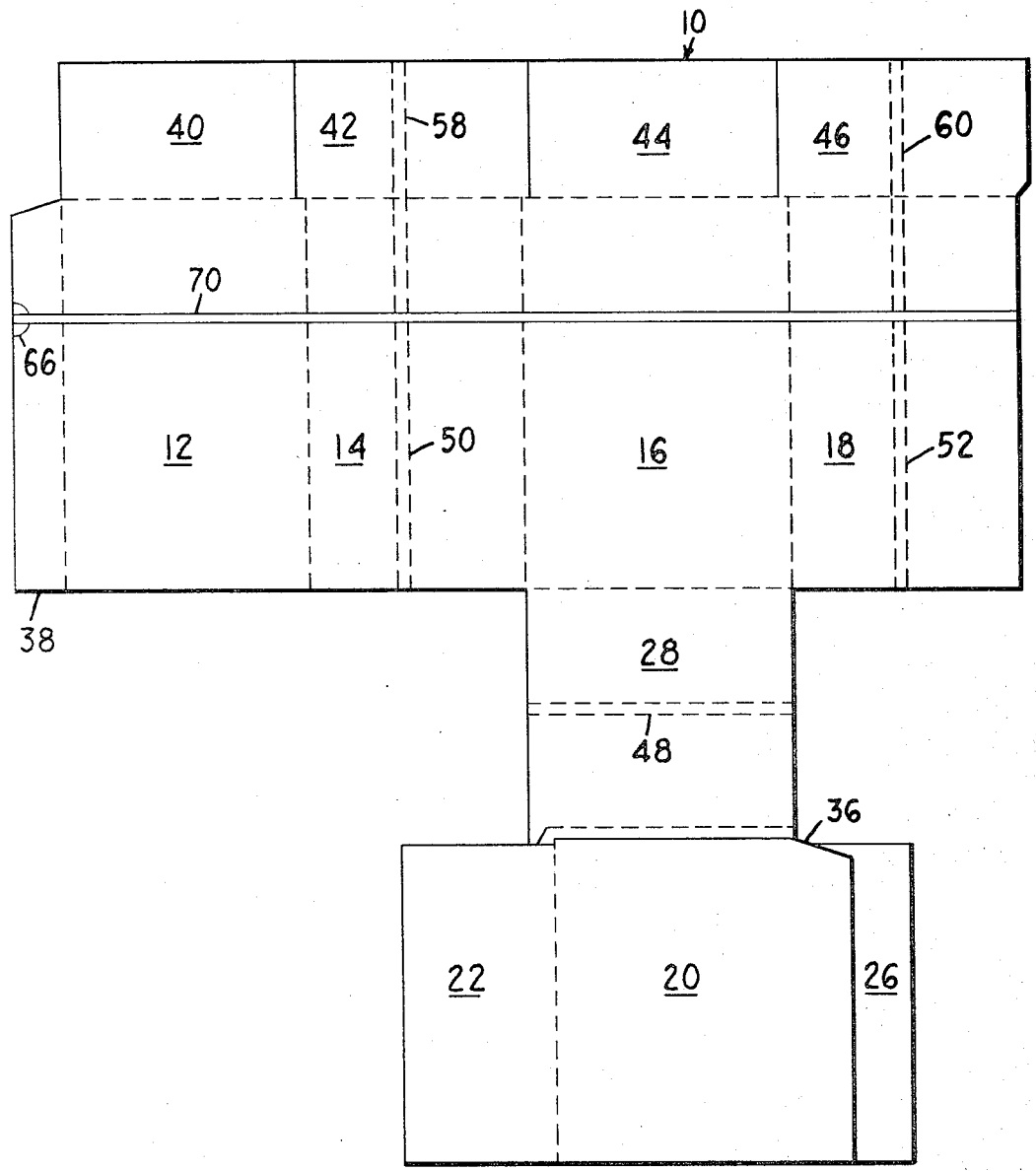
FIGURE 9 is a further corresponding plan view showing the second blank folding step by which the assembly of the liner elements is completed.

Next, second series panels 20, 22, 24, 26 are folded to the assembled relation shown in FIGURE 9 by doubling panels 22, 26 of this series at the medial scores 54, 56, therein, the aligned medial scores 62, 64 providing at the same time for similar doubling of flap panels 32, 34 inwardly thereof.

Figure 10:
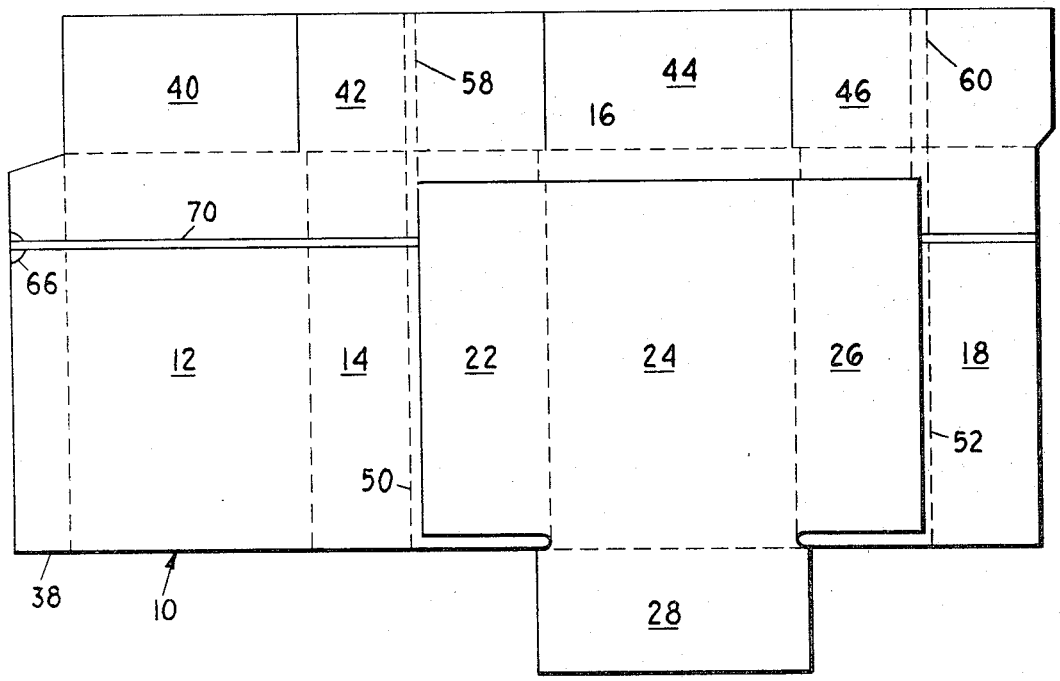
FIGURE 10 is a further corresponding plan view showing the third blank folding step by which the assembled liner elements are disposed in relation to the outer side wall panels.

The thus assembled second series panels 20, 22, 24, 26 are then placed in adjacent relation with respect to the panels of the first series by folding upwardly about medial score 48 in connecting panel 28, as shown in FIGURE 10, so that panel 20 of the second series is disposed in face-to-face relation with respect to panel 16 of the first series, so that panels 14, 18 of the first series may be doubled about medial scores 50, 52 therein to complete the folding of the blank elements, in the form shown in FIGURE 11, for securing at the side edge flap 38, as by stapling 72, to provide container structure 10 of the present invention in collapsed form as seen in FIGURE 1.

To set up this collapsed carton structure 10 to the erect form shown in FIGURE 4, it is only necessary to push inwardly on the medially scored panels 14, 18 of the first series so as to square up container structure 10, and then fold downwardly flap panel 30 to a position overlying connecting panel 28 in order to hold container structure 10 in this squared position, whereupon the other medially scored flap panels 32, 34 may be additionally folded downwardly to overlie connecting panel 28 as well.

In this erect form, panels 12, 14, 16, 18 of the first series form the outer side walls of container structure 10, with closure flaps 40, 42, 44, 46 thereon extending upwardly to form an open top for filling that may subsequently be closed in the usual manner. The outer bottom wall of container structure 10 is formed by connecting panel 28, with additional flap members 30, 32, 34 serving to complete a bottom in the container structure of four thicknesses. Remaining panels 20, 22, 24, 26 of the second series form liner elements within container structure 10 so that a double thickness of paperboard is provided at all of the side walls.

Upon filling of container structure 10, a top pad may be placed therein, if desired, and the closing of the top end completed by simply folding and securing top closure flaps 40, 42, 44, 46 in the usual overlapping relation. Flap member 30 is provided on liner panel 20 of the second series and may alternatively be separated and used as a top pad in container structure 10, while still leaving a bottom of three thicknesses therein. Also, the medial scoring of liner element panel 26 and flap panel 34 thereon may be eliminated to increase the bracing action of these elements when container structure 10 is erected. Either of these changes may be made in container structure 10 without otherwise substantially changing the manner in which it is folded from the initial blank form to assembled collapsed form, or in the manner in which it is set up to erect form.

Container structure 10 while being adapted for many uses, is particularly adapted for packaging nails as prior known paperboard nail container structures require tedious and time consuming set-up operations in assembling the container structures from blanks as well as involving a considerable packaging material inventory and a substantial allotment of space for the container assembly operations. The strength requirements for packaging nails also make it necessary to provide reinforcing liner elements in the container structure, and it has been found in the past particularly difficult to hold these liner elements properly in place during nail packaging operations which involves a shaking of the package as it is filled with nails so as to obtain a compact packaging unit. In addition, these prior known paperboard nail container structures require bottom as well as top sealing which is difficult to accomplish readily with heavy package loads such as are involved in packaging nails.

The paperboard container structure 10 provided according to the present invention simplifies and expedites very substantially the handling required in preparing and using it for packaging. This improved container structure 10 is formed from a unitary blank and arranged so that it may be pre-assembled in collapsed form for simple and rapid erection in practice for use. The unitary nature of the container structure 10 thus provided, integrates the liner elements thereof in a manner that obviates any displacement of these elements during the packaging operation, and also results in forming an initially closed bottom end upon erection that eliminates the necessity for any bottom sealing whatsoever in completing the packaging operation.

Figure 12:
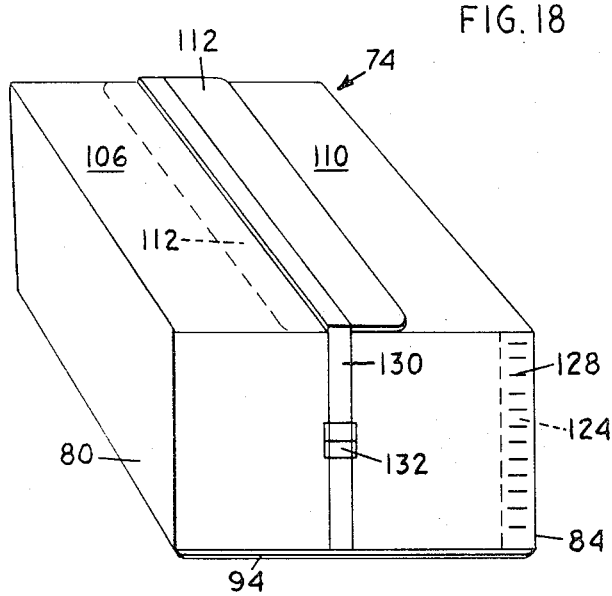
FIGURE 12 is a perspective view of a container structure forming another embodiment of this invention.
Figure 13:
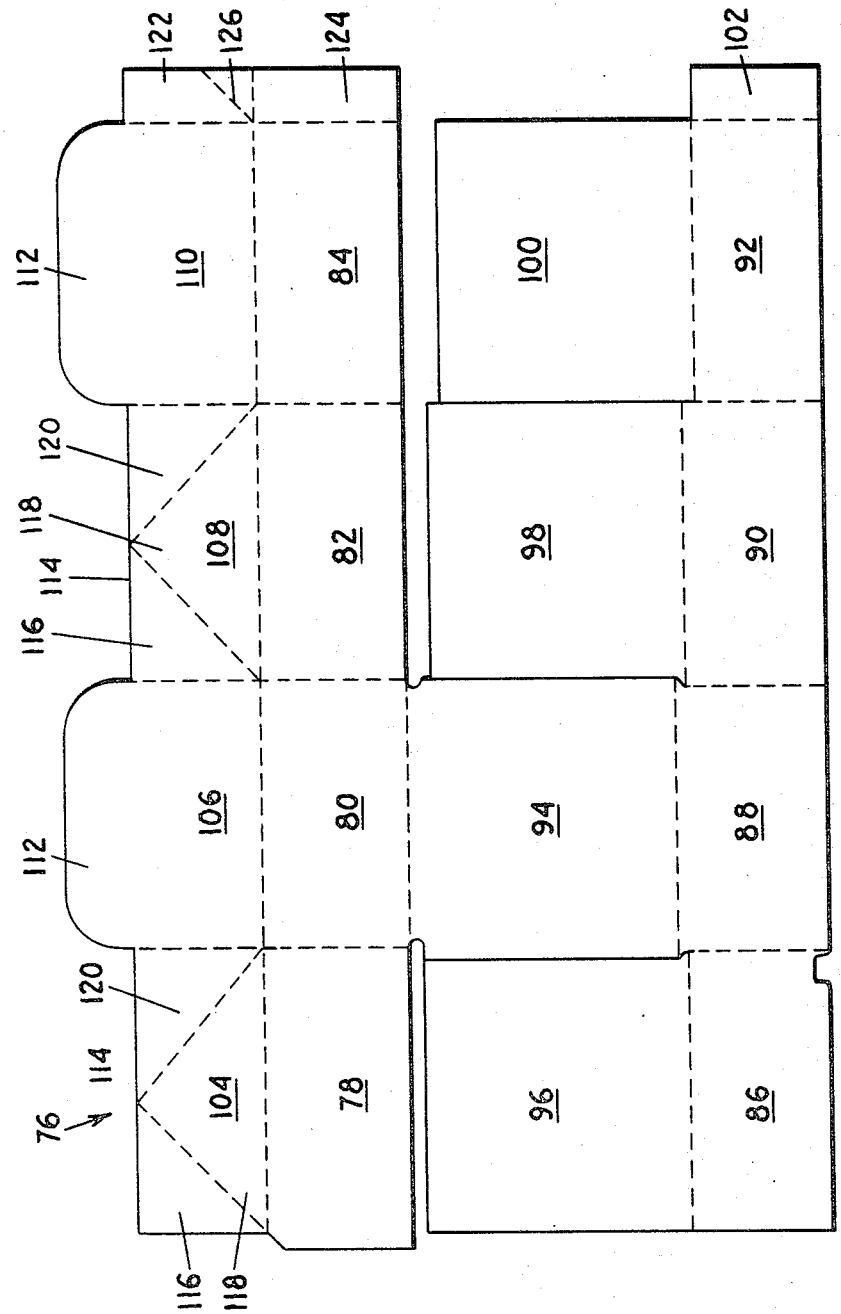
FIGURE 13 is a plan view of another blank formed in accordance with the teachings of this invention, the blank forming the container structure illustrated in FIGURE 12.

Another container structure of this invention is illustrated in FIGURE 12 and is generally indicated by numeral 74. Container structure 74 may be made from an improved blank of this invention illustrated in FIGURE 13 and generally indicated by reference numeral 76.

The substantially rectangular blank 76 is suitably cut and scored to define a first series of foldably connected side wall means or panels 78, 80, 82, 84, and a second series of foldably connected liner panel means or panels 86, 88, 90, 92. Sidewall means 78, 80, 82, 84 are utilized to form the four outside side walls of container structure 74 and liner panel means 86, 88, 90, 92 are utilized to form the four inside walls of container structure 74 in a manner hereinafter described.

A bottom wall or connecting panel 94 is respectively foldably connected at opposed side edges thereof to bottom edges of panels 80, 88. Bottom walls or panels 96, 98, 100 are respectively foldably connected at one of the side edges thereof to the bottom edges of liner panels 86, 90, 92. A narrow interlocking flap 102 is foldably connected to the terminal or outer edge of liner panel 92 for a purpose hereinafter described.

A series of foldably connected cover flap means or panels 104, 106, 108, 110 are respectively foldably connected at the inner or side edges thereof to the outer or top edges of side wall means or panels 78, 80, 82, 84. Cover flap means or panels 106, 110 respectively have extensions or free ends 112 extending a predetermined distance beyond outer edges 114 of the other pair of cover flap means 104, 108.

Cover flap means 104, 108 are each scored and/or slit on the inner surface thereof to define three triangular sections 116, 118, 120 which form a bellows structure more fully described hereinafter. The width of each cover flap means 104, 108 is twice the height thereof for a purpose hereinafter set forth.

A pair of foldably connected fastening flaps 122, 124 is respectively foldably connected to terminal or outer edges of respective panels 110, 84. Fastening flap 122 is angularly scored at 126 for a purpose hereinafter described.

To form container structure 74 from blank 76, blank 76 may be folded in many different ways, either manually or automatically and, for the purpose of illustration and not limitation, one method for manually forming carton structure 74 from blank 76 is as follows. Similar methods of assembling the other container structures of this invention are also hereinafter set forth only for the purpose of illustrating one such folding method, as many different methods may be utilized.

Figure 14:
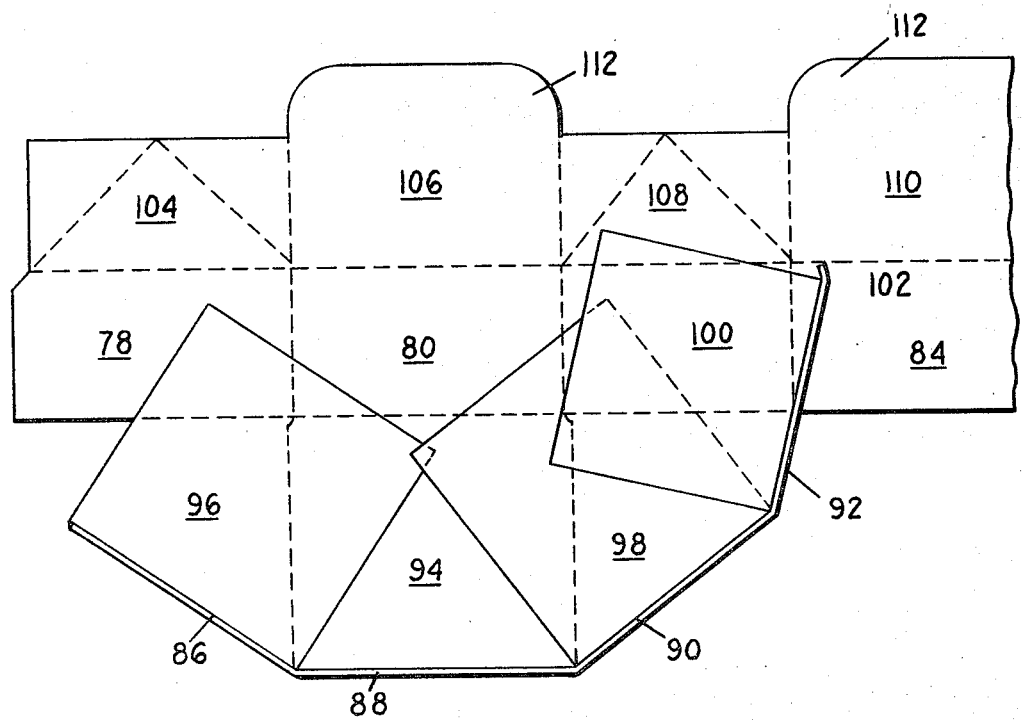
FIGURE 14 is a plan view illustrating one method for folding certain of the panels of the blank illustrated in FIGURE 13.
Figure 15:
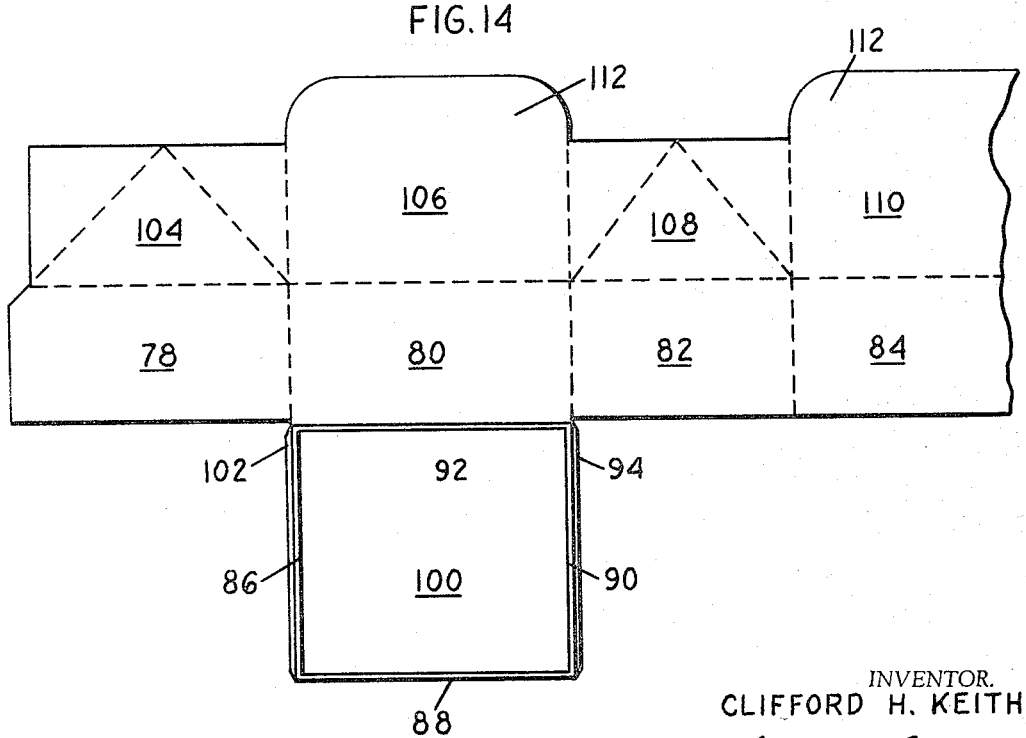
FIGURE 15 illustrates the blank of FIGURE 13 folded into another of its folded positions.

As shown in FIGURE 14, liner panel means 86, 88, 90 and 92 are respectively bent perpendicular to connecting bottom walls 94, 96, 98, 100. Bottom walls 96, 98, 100 are superimposed respectively upon bottom wall 94 in the order and in the manner illustrated in FIGURE 14 to provide a four sided structure having four bottom walls as illustrated in FIGURE 15. When blank 76 is formed of corrugated paperboard and the like, it can be seen that certain of the corrugations in bottom panels 96, 94, 98, 100 extend transversely relative to certain of the corrugations of the other bottom walls whereby further reinforcing of the bottom of container structure 74 is provided.

By merely grasping bottom walls 96, 98, 100 and superimposing them upon each other in the manner illustrated in FIGURE 14, the respective foldably connected liner panel means 86, 88, 90, 92 will be automatically bent perpendicular to their respective bottom walls 96, 94, 98, 100 by the bending action resulting from superimposing bottom walls into the stacked relation illustrated in FIGURE 15.

Figure 16:
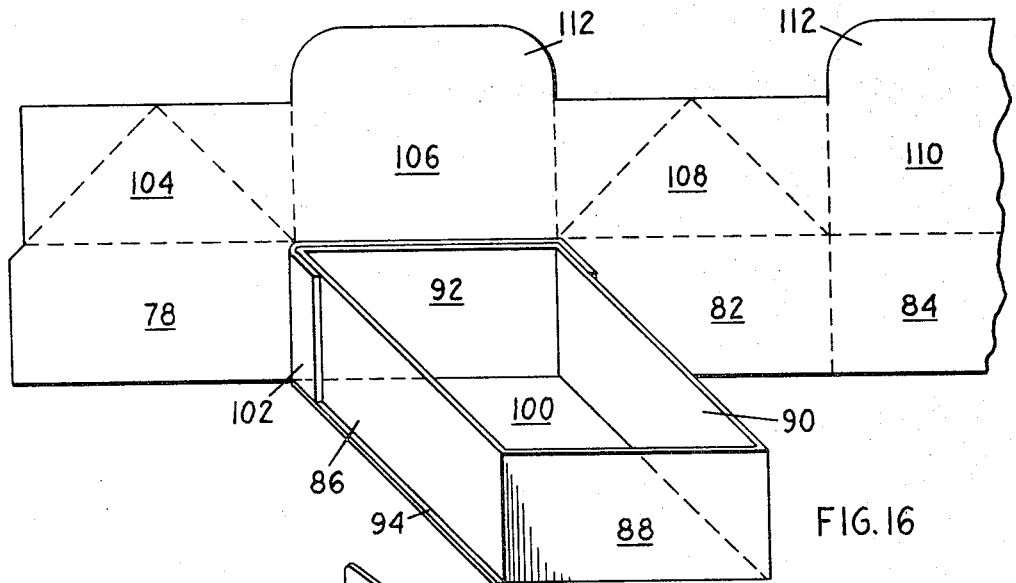
FIGURE 16 is a perspective view of the blank illustrated in FIGURE 13 and illustrates the blank in another of its folded positions.

After liner panel means 86, 88, 90, 92 and bottom walls 96, 94, 98, 100 have been folded and assembled in the manner illustrated in FIGURE 15, flap 102, foldably connected to liner panel 92, is bent around the outside surface of liner panel 86 in the manner shown in FIGURE 15 to lock liner panels 86, 88, 90, 92 together. Subsequently, the liner panel and bottom wall structure is bent perpendicular to side wall panel 80 in the manner shown in FIGURE 16, whereby the liner panel means 92 is disposed parallel to and closely adjacent side wall means 80 to provide a double side wall at that particular side of container structure 74.

Figure 17:
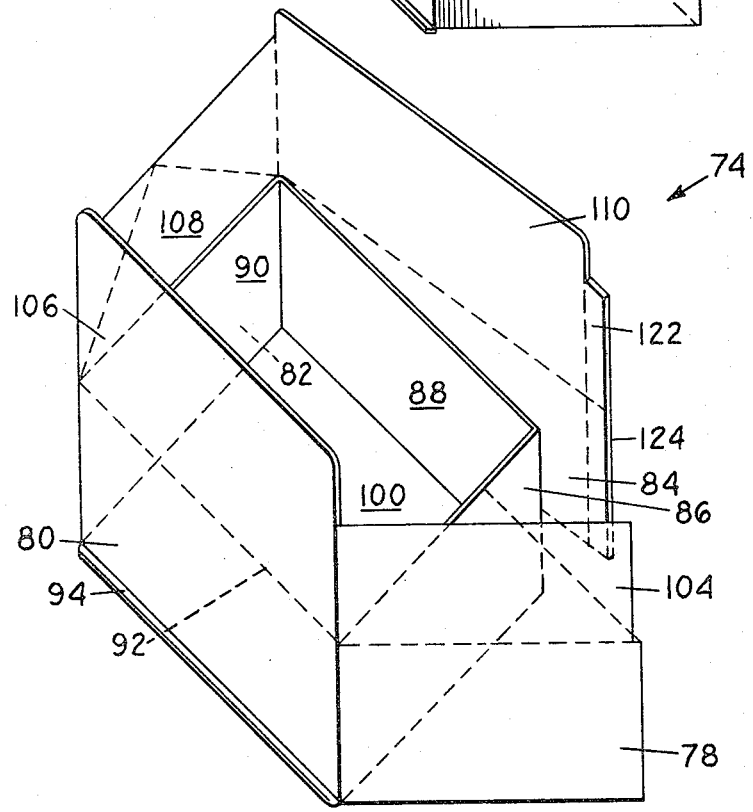
FIGURE 17 is a perspective view of the blank illustrated in FIGURE 13 and illustrates the blank in its partially assembled position.

As shown in FIGURE 17, side wall means 78 is superimposed upon liner panel means 86 and, similarly, side wall means 82, 84 are superimposed upon liner panel means 98, 88.

Fastening flaps 122, 124 are respectively disposed between liner panels 86 and terminal portions of cover flap means 104 and side wall means 78 and are fastened respectively to cover flap means 104 and side wall means 78 in any suitable manner as by gluing, stapling or the like. In the embodiment of the drawings, fastening flaps 122, 124 are secured respectively to cover flap means 104 and side wall means 78 by staples 128. Staples 128 may extend through lower fastening flap 124 into liner panel 86 to secure side wall means 78, fastening flap 124 and liner panel means 86 together, if desired.

Figure 18:
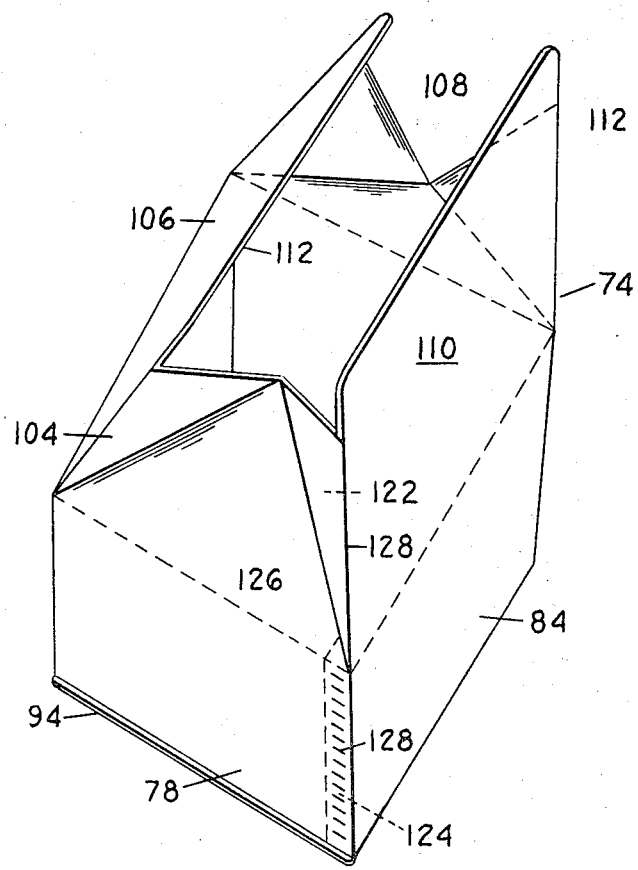
FIGURE 18 is a perspective view of the container illustrated in FIGURE 12 and illustrates the same in its partially opened position.
Figure 19:
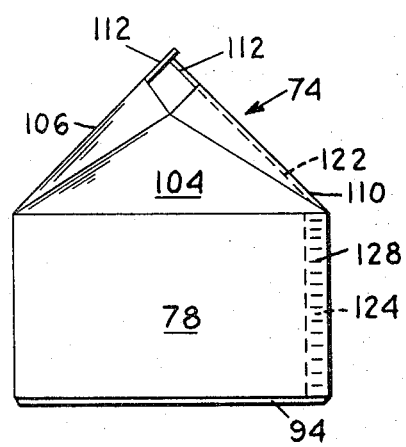
FIGURE 19 is a side view of the container illustrated in FIGURE 12 and illustrates the method of closing the cover means thereof.

When it is desired to completely close container structure 74, the opposed pair of outer flap cover means 106, 110 is bent downwardly toward container structure 74 whereby the other pair of opposed inner cover flap means 104, 108 form bellows structures therewith as the intermediate triangular sections 118 thereof project inwardly toward each other as shown in FIGURES 18, 19. As outer cover flap means 106, 110 are brought together in the manner shown in FIGURE 19, one of the free ends 112 of either cover flap means 106, 110 is received under the free end 112 of the other cover flap means 106, 110. As shown in FIGURE 19, free end 112 of cover flap means 110 is received between cover flap means 106 and the respective triangular portions 120 and 116 of inner cover flap means 104, 108.

Further downward movement of cover flap means 106, 110, from the position shown in FIGURE 19 to the position shown in FIGURE 12, permits cover flap means 106, 110 to be disposed substantially parallel to each other and substantially perpendicular to respective side wall means 80, 84 without bending free ends 112 of cover flap means 106, 110. Free ends 112 of cover flap means 106, 110 are respectively adapted to overlap a portion of the other cover flap means 106, 110 when the cover means are disposed in the position shown in FIGURE 12.

In order to maintain cover flap means 108, 110 in the closed position shown in FIGURE 12, a suitable binding strap 130 formed of metal or the like can be secured around container structure 74 and fastened as at 132. Since the free ends 112 of cover flap means 106, 110 respectively overlap portions of cover panel means 106, 110, a substantially large reinforced area of the cover is provided for receiving strap 130. In this manner, strap 130 will not tend to cut into the top edges of side walls 78, 82 of container structure 74 when strap 130 is drawn tightly around container structure 75.

It can be seen that blank 76 forms a container structure having reinforced bottom, sides and top whereby the container structure can be utilized for transporting and storing high density goods. Further, when the container structure is closed in the above manner, other containers can be readily stacked thereon.

While only certain forms of the invention have been shown and described herein, it will be readily apparent to those skilled in the art that many modifications and/or equivalents may be made and employed without departing from the scope of the invention which is defined in the appended claims.

What is claimed is:

1. A four-sided container comprising a series of four foldably connected side wall means each having a top and a bottom edge, said series defining said four sides of the container, a series of four foldably connected wall liner panels each having a top and a bottom edge, a bottom panel foldably interconnected between one of said side wall means and one of said liner panels, three bottom liner panels each having opposed pairs of side edges and being respectively foldably connected at one of said side edges thereof to the bottom edges of the remaining wall liner panels, said bottom liner panels being superimposed in stacked relation upon said bottom panel, said liner panels being disposed closely adjacent said series of side wall means to provide a container having doubled side walls and quadrupled bottom walls.

2. Container according to claim 1 and additionally including medial scoring each side wall means adjacent said one side wall means and in each corresponding aligned wall liner panels, and medial scoring in said bottom panel and in each bottom liner panel adjacent thereto extending transversely to the medial scoring in the side wall means and in the liner panels whereby said container is collapsible.

3. Container according to claim 1 and additionally including a series of four closure flaps foldably connected to said series of side wall means at the top edges thereof.

4. Container according to claim 2 and additionally including a series of four closure flaps foldably connected to said series of side wall means at the top edges thereof, and medial scoring in two of said flaps and aligned with the medial scoring in the corresponding side wall means to which said two flaps are connected.

References Cited
UNITED STATES PATENTS

| | | | |
|---|---|---|---|
| 2,565,682 | 8/1961 | Guger | 229—16 |
| 2,913,162 | 11/1959 | Goltz | 229—16 X |
| 2,922,562 | 1/1960 | Pellaton | 229—16 X |
| 3,002,672 | 10/1961 | Kotowick | 229—16 |
| 3,031,123 | 4/1962 | Keith | 229—16 |

JOSEPH R. LECLAIR, *Primary Examiner.*

D. T. MOORHEAD, *Assistant Examiner.*